R. E. DAVIS.
ANTIDRY METER VALVE LIFTING DEVICE.
APPLICATION FILED MAR. 16, 1908.

934,050.

Patented Sept. 14, 1909.
2 SHEETS—SHEET 1.

WITNESS:
Geo Selguern
John R. Davis

INVENTOR
Robert Emmett Davis

R. E. DAVIS.
ANTIDRY METER VALVE LIFTING DEVICE.
APPLICATION FILED MAR. 16, 1908.
934,050.
Patented Sept. 14, 1909.
2 SHEETS—SHEET 2.
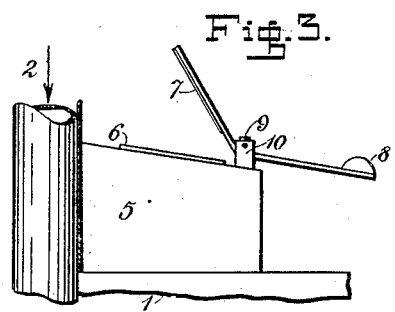
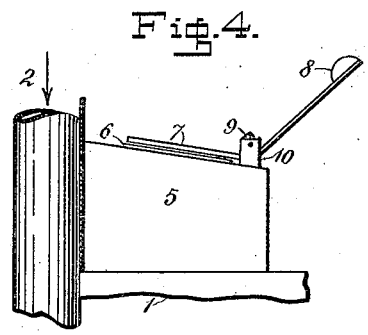
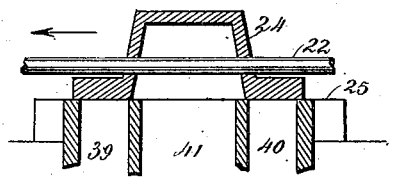
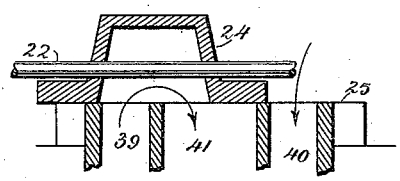
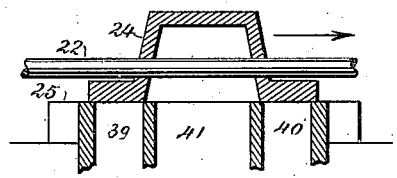

UNITED STATES PATENT OFFICE.

ROBERT EMMETT DAVIS, OF NEW ORLEANS, LOUISIANA.

ANTIDRY-METER-VALVE-LIFTING DEVICE.

934,050.

Specification of Letters Patent.   Patented Sept. 14, 1909.

Application filed March 16, 1908.   Serial No. 421,587.

*To all whom it may concern:*

Be it known that I, ROBERT EMMETT DAVIS, a citizen of the United States of America, residing at New Orleans, in the parish of Orleans and State of Louisiana, have invented certain new and useful Improvements in Antidry-Meter-Valve-Lifting Devices, of which the following is a specification, reference being had therein to the accompanying drawing.

My invention relates to an improvement in an antidry meter valve lifting device, and its novelty will be fully understood from the following description, and claims, when taken in connection with the annexed drawings, and the objects of my invention are to provide a gas meter with automatic valves made of aluminum that will be lifted from their seats by the gas when the pressure thereof is reversed, and means to prevent gas having thus passed these valves from passing out of the meter backward. I attain these objects by the mechanism illustrated in the accompanying drawings, in which—

Figure 1:
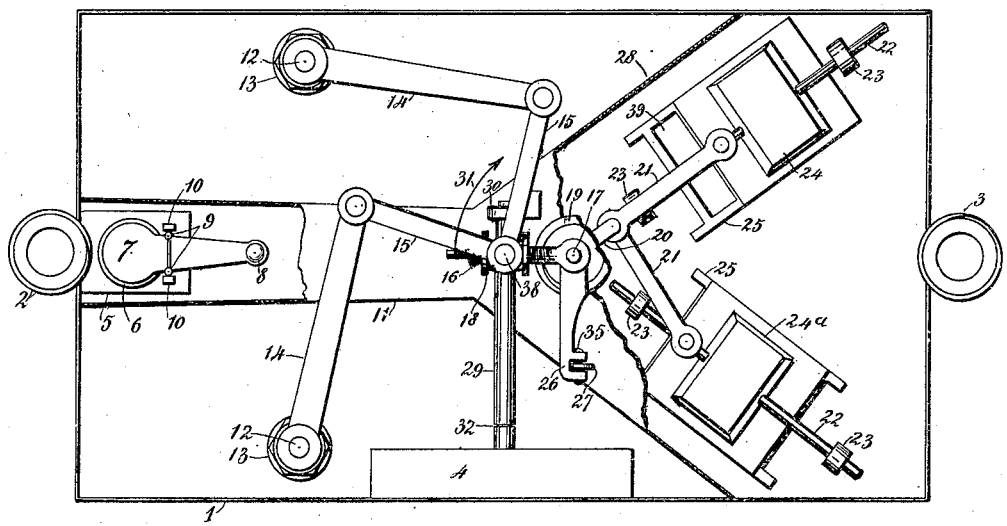
Figure 2:
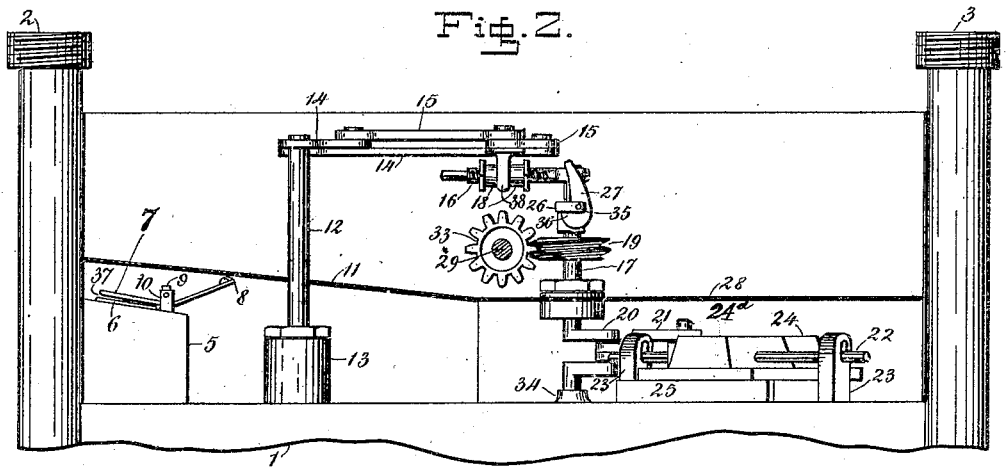

Figure 1 is a top view of meter with cover removed and the top of the inlet canal and slide valve box partially broken away. Fig. 2 is a front sectional side view of meter showing inlet canal and slide valve box. Fig. 3 is a side view of trap valve in position for admission of gas. Fig. 4 is a side view of trap valve closed. Fig. 5 is a view of slide valve when tangent screw has made a quarter of a revolution. Fig. 6 is a view of slide valve when the tangent screw has made half of a revolution. Fig. 7 is a view of slide valve when the tangent screw has made three quarters of a revolution.

In the drawings —1— represents case of meter; —2— an inlet port for gas; —3— an outlet port for gas; —4— is a dial case; —5— is a trap valve case; —6— is the trap valve case seat; —7— is the trap valve; —8— is the trap valve counter-weight; —9— are pivots of trap valve; —10— are trap valve pivot supports; —11— is a casing connected to the inlet port and forming an inlet canal for gas; —12— is a flag rod; —13— is a flag rod stuffing box; —14— are arms; —15— are arm links; —16— is a tangent screw; —17— is a crank shaft; —18— are tangent screw adjusting nuts; —19— is a worm; —20— is a crank; —21— are slide valve arms; —22— are slide valve rods; —23— are slide valve rod guides; —24— —24ᵃ are aluminum slide valves; —25— are slide valve seats; —26— is a king post; —27— is a king post dog; —28— is a slide valve box or inclosure; —29— is a worm wheel shaft; —30— is a worm wheel shaft support; —31— in Fig. 1 is an arrow showing direction of movement; —32— is a worm wheel shaft coupling; —33— is a worm wheel; —34— is a crank shaft bearing; —35— is a dog pin; —36— is a dog stop; —37— is a space between trap valve seat 6 and trap valve 7; —38— is an adjustable tangent screw pivot; —39— is a port in slide valve seat; —40— is a port in slide valve seat; —41— is an exhaust port.

In describing the operation of the slide valves 24 and 24ᵃ, I will start with the valves and valve operating mechanism in the position indicated in Fig. 1, in which the slide valve 24 is in its extreme rearward position with its link 21 and the crank 20 in alinement with each other, and with the port 39 open and the port 40 and the exhaust port 41 in communication with each other, while the slide valve 24ᵃ is midway of its rearward movement with all the ports closed as shown in Fig. 7. After a quarter of a revolution of the crank 20 (in the direction indicated by the arrow 31) the slide valve 24 is brought midway its forward stroke as illustrated in Fig. 5; and the slide valve 24ᵃ is moved to its extreme rearward position with its forward port 39 open and its rearward port 40 in communication with the exhaust port 41. After another quarter of a revolution the slide valve 24 is brought to the position shown in Fig. 6 with the rear port 40 open and the front port 39 in communication with the exhaust port 41; while the valve 24ᵃ has in the meantime advanced midway its forward movement, with all the ports closed. After a three quarter revolution of the crank-pin 20 in advance of the position it occupied in Fig. 1, the slide valve 24 is brought midway its rearward movement closing all ports, while the slide valve 24ᵃ is in its extreme forward position with the port 40 open and the port 39 and the exhaust port 41 in communication with each other. At this time the tangent screw 16 having passed the dog —27— it cannot come back. After the last quarter of the revolution is made all the parts are again in the position shown in Fig. 1 ready to repeat the operation just described. When the meter is not in operation the trap valve —7— is slightly open as shown at 37, but when in operation, is fully open as shown in Fig. —3— and if from any cause the gas should go backward, this valve is so well balanced that it is closed and prevents all flow of gas through same.

By means shown in my construction gas is prevented from passing backward through a meter unregistered by my trap valve which is constructed of aluminum. My trap valve opens automatically when gas enters through the inlet port and closes automatically when gas enters meter through the outlet port; my trap valve is balanced in such a manner as to remain partially open when not in use as shown in Fig. 2 and by this means top of trap valve does not adhere to the seat. By my construction, if it be attempted to pass gas backward into the meter through the outlet port, the light aluminum valves will lift so easily from their seats, and permit such a free and easy backward escape of gas underneath them, that the trap valve will be attacked with such promptness as to be instantly closed. This result I could not satisfactorily accomplish by the use of any other metal than aluminum for my slide valves. By the use of this metal I gain the additional advantage that all grinding of the valve faces, when in operation, is prevented. A further advantage of my construction is that all the gas which enters through the outlet port and passes upwardly between the aluminum valves and seats as described above, is prevented from passing out of the meter by the aluminum trap valve. But the above results can only be obtained by the use of valves formed of a very light metal.

Having described my invention and the manner in which the same is or may be carried into operation, would say in conclusion that I do not limit myself to the precise details shown in illustration, as the same may be varied to some extent, but

What I claim and desire to secure by Letters Patent, is—

1. In a device of the character described, the combination with an inlet and an outlet pipe, of a closed chamber interposed between said pipes, said chamber having an opening leading to the inlet pipe and openings leading to the outlet pipe, a trap valve controlling the opening leading to the inlet pipe, said trap valve being independent of the working mechanism of the meter and adapted to open to forward pressure of the gas, and to be closed by reverse pressure thereof, and aluminum slide valves controlling the openings leading to the outlet pipe, said valves being adapted to be lifted upwardly from their seats.

2. In a device of the character described, the combination with an inlet and an outlet pipe, of a normally inaccessible chamber in communication with the inlet pipe and provided with ports for valved communication with the outlet pipe; aluminum slide valves controlling said ports, said slide valves being adapted to be lifted from their seats by gas pressure applied thereto from the outlet pipe; an independent trap valve located in said inaccessible chamber in the path of the gas between said slide valves and the inlet pipe of the meter, and means for normally holding said trap valve partly open, said valve being adapted to fully open to forward pressure of the gas and to close against reverse pressure thereof, and said slide valves being made light whereby to lift easily from their seats to permit a free reverse passage of gas underneath the same in order to promptly act upon and close said trap valve.

In testimony whereof I affix my signature in presence of two witnesses.

ROBERT EMMETT DAVIS.

Witnesses:
 JOHN R. DAVIS,
 JNO. J. WARD.